United States Patent
Aburto Crespo

(10) Patent No.: US 9,452,709 B2
(45) Date of Patent: Sep. 27, 2016

(54) ILLUMINATED INSTRUMENT CLUSTER

(71) Applicant: Continental Automotive Systems, Inc., Auburn Hills, MI (US)

(72) Inventor: Hiram Aburto Crespo, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/307,744

(22) Filed: Jun. 18, 2014

(65) Prior Publication Data

US 2015/0367775 A1    Dec. 24, 2015

(51) Int. Cl.
*B60Q 3/00* (2006.01)
*B60Q 3/04* (2006.01)
*G02B 6/10* (2006.01)
*G02B 1/10* (2015.01)

(52) U.S. Cl.
CPC ............... *B60Q 3/008* (2013.01); *B60Q 3/044* (2013.01); *G02B 1/10* (2013.01); *G02B 6/102* (2013.01)

(58) Field of Classification Search
CPC ............... B60K 2350/203; B60K 2350/2039; B60K 2350/402; B60K 2350/403; B60K 35/00; B60K 37/02; B60K 2350/408; B60Q 3/04; B60Q 3/008; B60Q 3/042; B60Q 3/044; B60Q 3/00; B60Q 3/0246; F21Y 2101/02; G02F 1/133603; G02F 2001/133614; G02F 1/133609; H01L 33/50; H01L 33/60; H01L 33/502; F21S 48/00; G02B 6/102; G02B 1/10; G02B 6/10; H05B 33/14; H05B 33/20; F21V 9/14

USPC ......... 362/23.01, 23.11, 23.13, 23.18, 23.19, 362/84, 231, 489, 23.07, 23.08, 23.2, 85, 362/249.02, 276, 482

See application file for complete search history.

(56) References Cited

U.S. PATENT DOCUMENTS

| | | | | |
|---|---|---|---|---|
| 3,503,365 | A | * | 3/1970 | Baez ...................... G04B 19/30 116/287 |
| 4,561,042 | A | * | 12/1985 | Wehner et al. ............ 362/23.19 |
| 5,997,161 | A | | 12/1999 | Stringfellow et al. |
| 6,213,613 | B1 | * | 4/2001 | Muller .......................... 362/489 |
| 6,729,738 | B2 | * | 5/2004 | Fuwausa et al. ............... 362/84 |
| 6,871,986 | B2 | * | 3/2005 | Yamanaka et al. ........... 362/490 |
| 7,216,997 | B2 | * | 5/2007 | Anderson, Jr. ............ 362/23.01 |
| 7,394,190 | B2 | | 7/2008 | Huang |
| 7,436,560 | B2 | * | 10/2008 | Chen et al. ...................... 359/13 |
| 8,022,346 | B2 | * | 9/2011 | Newman et al. ............. 250/205 |
| 8,142,866 | B2 | * | 3/2012 | Iwase et al. ............... 428/32.13 |
| 8,931,909 | B2 | * | 1/2015 | Demma ..................... 362/23.16 |
| 2008/0158510 | A1 | * | 7/2008 | Tant et al. ....................... 353/14 |
| 2010/0110657 | A1 | * | 5/2010 | Weindorf ......................... 362/23 |
| 2010/0110707 | A1 | * | 5/2010 | Weindorf ...................... 362/489 |
| 2012/0327663 | A1 | * | 12/2012 | Doan ...................... F21V 9/08 362/294 |
| 2013/0142991 | A1 | * | 6/2013 | Cao et al. ..................... 428/138 |

FOREIGN PATENT DOCUMENTS

| | | |
|---|---|---|
| EP | 1734562 A2 | 12/2006 |
| JP | 08136285 A  *  | 5/1996 |

* cited by examiner

*Primary Examiner* — Hargobind S Sawhney

(57) ABSTRACT

An instrument cluster for a vehicle includes at least one ultra-violet light source behind an instrument panel. A base layer is applied to the instrument panel between the light source and the panel. The base is a crystalline structure powder layer operable to transform ultra-violet light into light within a visible light spectrum.

10 Claims, 4 Drawing Sheets

ILLUMINATED INSTRUMENT CLUSTER

TECHNICAL FIELD

The present disclosure relates generally to an instrument cluster for a vehicle, and more specifically to a method and apparatus for illuminating the instrument cluster.

BACKGROUND

Personal vehicles and commercial vehicles typically include a front mounted instrument cluster including multiple dials. Instrument clusters display vehicle information to the operator of the vehicle. In some cases, the displayed information can be essential operational information such as vehicle speed, and engine RPMs. In other cases the displayed information can be non-essential information, such as a radio station dial, or any other information.

In order to provide visibility during night time conditions, or other reduced light conditions, instrument clusters are illuminated using light sources. In order to provide multi-colored instrument clusters, and thereby render the instrument cluster easier to read and more aesthetically pleasing, multi-colored LED's are typically used as the light source, with a desired color LED providing light to a corresponding instrument cluster area or component. Utilization of multiple different colored LED's increases design complexity and increases the possibility of manufacturing errors.

SUMMARY OF THE INVENTION

Disclosed is an instrument cluster for a vehicle including at least one ultra-violet light source, an instrument panel disposed adjacent the ultra-violet light source, and at least a base layer disposed between an interior surface of the instrument panel and the at least one ultra-violet light source, wherein the base layer is a crystalline structure powder layer operable to transform ultra-violet light into light within a visible light spectrum.

Also disclosed is a method for creating an illuminated instrument cluster for a vehicle including applying a base layer between an interior surface of an instrument panel and at least one ultra-violet light source, wherein the base layer is a crystalline structure powder layer operable to transform ultra-violet light into light within a visible light spectrum.

Also disclosed is a method for illuminating an instrument cluster including illuminating a plurality of LEDs arranged such that ultra violet light from the LED's contacts a base layer applied to an interior surface of an instrument panel, converting ultra violet light from the plurality of LEDs into light in the visible spectrum using the base layer, and emitting visible light from the base layer through the instrument panel, thereby illuminating the instrument panel.

These and other features of the present invention can be best understood from the following specification and drawings, the following of which is a brief description.

DETAILED DESCRIPTION OF AN EMBODIMENT

Figure 1:
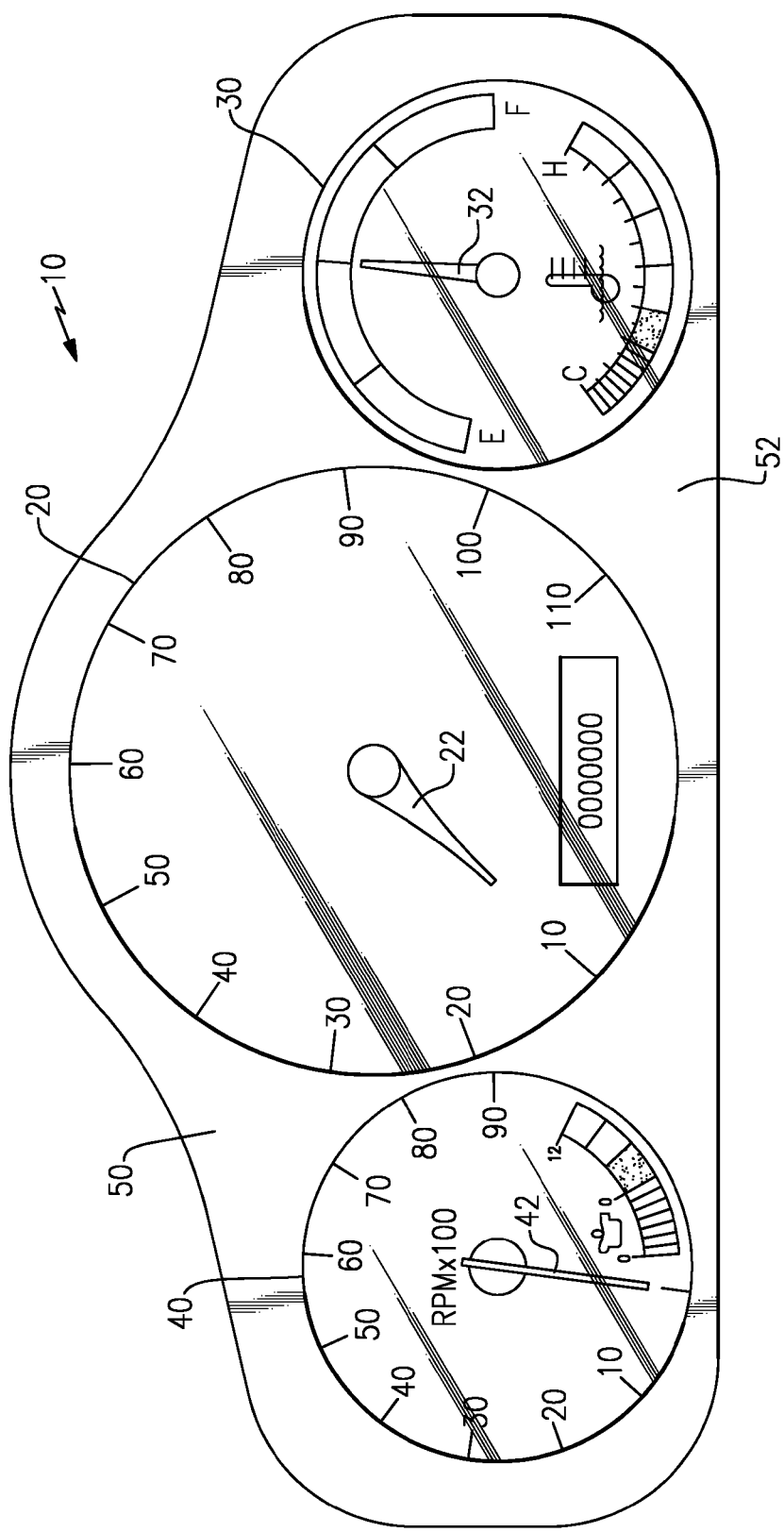
FIG. 1 schematically illustrates a vehicle instrument cluster from a vehicle operator's point of view.

FIG. 1 schematically illustrates a vehicle instrument cluster 10 from the point of view of a vehicle operator. The vehicle instrument cluster 10 includes multiple gauges 20, 30, 40 positioned in, or on, an exterior surface 52 of a polycarbonite panel 50. In alternative examples, panel 50 can be constructed of any alternate clear or translucent panel material, such as a plastic or acrylic material. Each gauge 20, 30, 40 displays information regarding the operation of the vehicle to the vehicle operator. Each of the gauges 20, 30, 40 includes a dial 22, 32, 42 that rotates and points to the information on the gauge 20, 30, 40, such as vehicle speed, engine RPM's, fuel levels, etc. Alternate style gauges, such as digital counters or display screens, can also be implemented in addition to, or in place of the dial based gauges 20, 30, 40. In order to differentiate between the varied gauges 20, 30, 40, and make the instrument cluster 10 more readable and aesthetically pleasing to an operator, each of the gauges 20, 30, 40 can be different colors, or have color coded information. Additionally, each gauge 20, 30, 40 can be a different color from the perceived color of the polycarbonate panel 50 to further differentiate the panel 50 from the gauges 20, 30, 40.

In order to allow the gauges 20, 30, 40 to be seen in dark or dim conditions, such as night time, the instrument cluster 10 is illuminated. Existing instrument clusters are typically illuminated using colored LEDs, with the particular wavelength (color) of the LED corresponding to the desired color of the portion of the instrument cluster illuminated by the LED. The use of multiple different LED types for the multiple different colors increases the complexity of the instrument cluster assembly.

Figure 2:
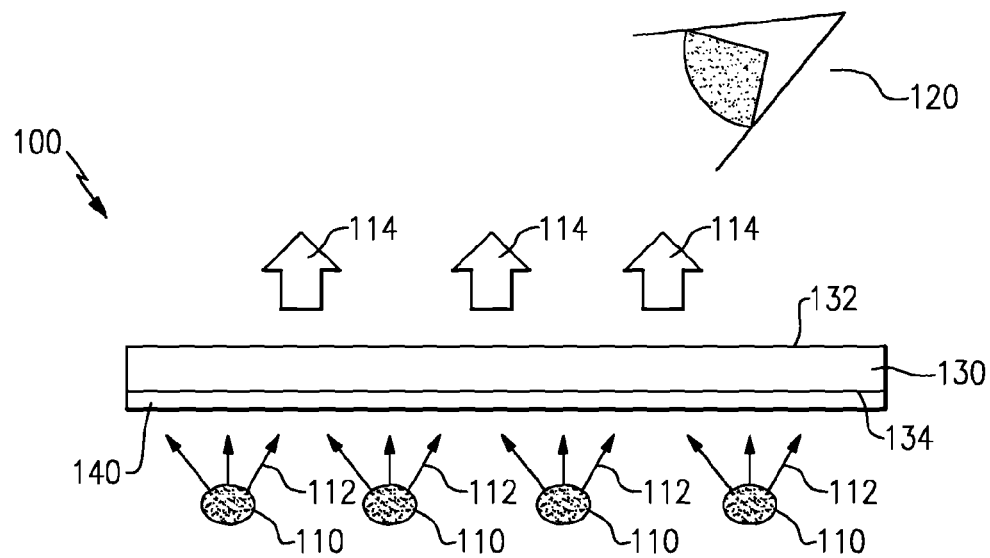
FIG. 2 schematically illustrates a side view of a vehicle instrument instrument cluster.

With continued reference to FIG. 1, FIG. 2 illustrates an instrument cluster 100 from a side view. In the example instrument cluster 100 of FIG. 2, the instrument cluster 100 is illuminated from an interior side, opposite an observer 120, using multiple Ultra-Violet (UV) light sources 110, such as ultra-violet LEDs.

The instrument cluster 100 includes a polycarbonate panel 130 (corresponding to the polycarbonate panel 50 of FIG. 1) having an internal surface 134 and an external surface 132. The external surface 132 is facing, and visible to, the vehicle operator 120. Disposed on the internal surface 134 of the polycarbonate panel 130 is a base layer 140 of a crystalline material. The crystalline structure of the base layer 140 is excited by UV light, and emits light within the visible spectrum (wavelengths from about 390 to 700 nm) when UV light contacts the base layer 140.

To illuminate the instrument cluster 100, UV light 112 is emitted from the UV light sources 110, and contacts the base layer 140. A portion of the UV light 112 is absorbed by the base layer 140 as excitation energy. The excitation energy causes the base layer 140 to emit light in the visible spectrum. The visible spectrum light 114 passes through the polycarbonate panel 130 and is visible to the operator 120. In this way the UV light sources 110 combined with the base layer 140 provide a back light effect that illuminates the instrument cluster 100.

The base layer 140 is applied to all portions of the interior surface 134 of the polycarbonate panel 130 that are exposed to the UV light 112. When UV light strikes a polycarbonate material, the UV light interacts with the material causing a material degradation. When the UV light 112 strikes the base layer 140, all of the light is either converted into light within the visible spectrum or reflected, and no UV light is passed through to the polycarbonate paneling 130. In this way, the base layer 140 also protects the polycarbonate panel 130 from degradation due to UV light contact.

Figure 3:
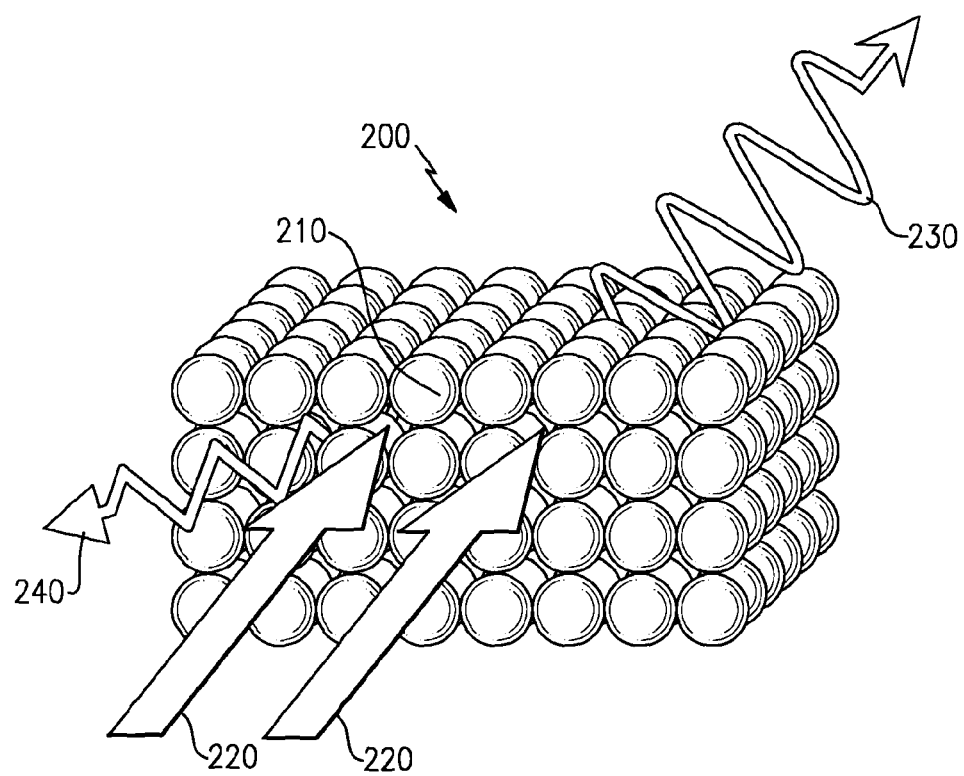
FIG. 3 schematically illustrates the crystalline structure of a crystalline material base layer.
Figure 4:
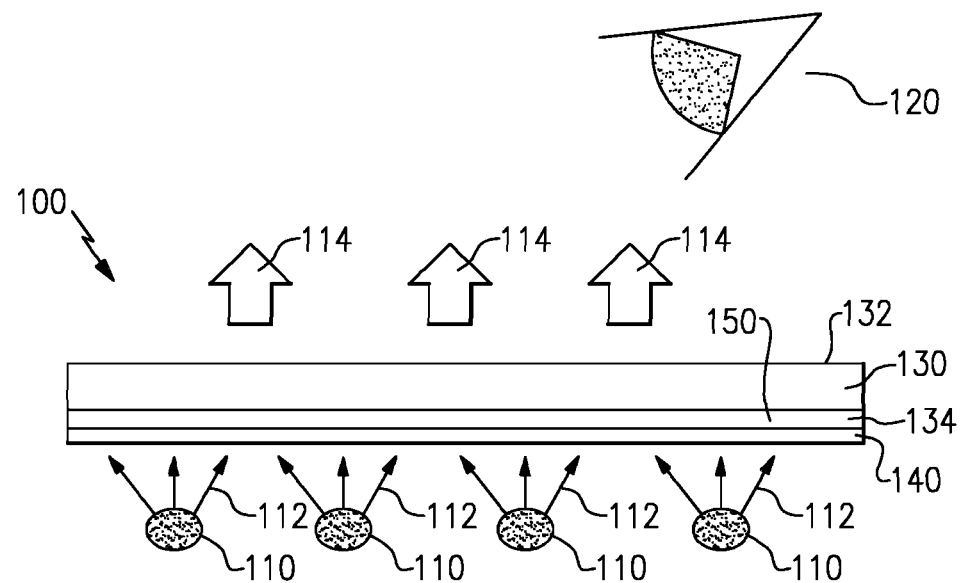
FIG. 4 schematically illustrates a side view of a first alternate vehicle instrument cluster.

In a practical implementation, the base layer 140 is applied to the polycarbonate panel 130 using a combination of vapor deposition and Serigraphy. With continued reference to FIG. 2, FIG. 3 illustrates an exemplary crystalline nanostructure of an exemplary powder material used to create the base layer 140. When applied to the polycarbonate panel 130 via a vapor deposition process, the powder forms a crystalline material with a nanostructure such as the nanostructure 200 illustrated in FIG. 3. When UV light 220 contacts the nanostructure 200, the energy from the UV light 220 excites individual elements 210 within the crystalline structure 200 causing the elements 210 to emit light (photons 230) within the visible light spectrum, and reflect phonons 240 back toward the UV light source 110. In this way, the base layer 140 of FIG. 2 transforms the UV light from the UV light sources 110 into visible spectrum light 230.

Referring again to FIG. 2, when only a base layer 140 is applied to the polycarbonate panel 130, a single color of light will be passed through the polycarbonate panel 130. In a typical example, this color is white light encompassing the full visible spectrum. In alternate examples, the crystalline structure 200 can be designed to emit only a portion of the visible spectrum, resulting in a colored light. Dials, or other indicators, can be printed on the exterior surface 132 of the polycarbonate panel 130, and create a shadowed effect. In some examples a transparent coloration can be printed on portions of the exterior surface 132 of the polycarbonate panel 130 to introduce a color effect to the instrument cluster.

With continued reference to FIG. 1-3, FIG. 4 illustrates an alternate example instrument cluster 100 with an additional color layer 150 disposed between the interior surface 134 of the polycarbonate panel 130 and the base layer 140. The color layer 150 covers the entire interior surface 134 of the polycarbonate panel 130 and provides a filter effect to the visible light 114 emitted from the base layer 140. Depending on the composition and thickness of the color layer 150, specific wavelength bands of the emitted visible light 114 can be reflected by the color layer 150, effectively removing that wavelength from the emitted visible light 114. The particular wavelengths that are removed and the wavelengths that are passed can be tailored by one of skill in the art to generate a desired color.

Figure 5:
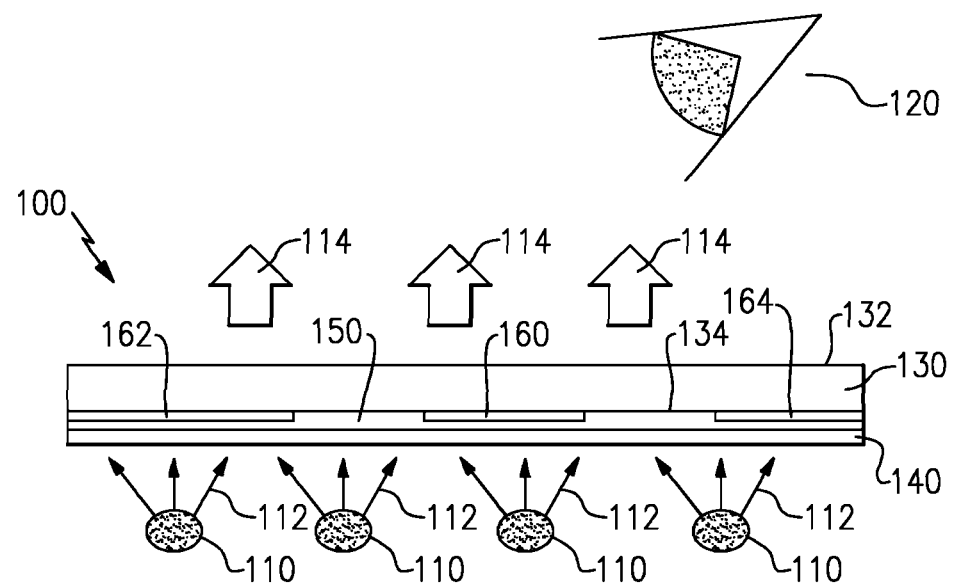
FIG. 5 schematically illustrates a side view of a second alternate vehicle instrument cluster.

FIG. 5 illustrates another alternate example instrument cluster 100 including multiple color layers 150, 160, 162, 164 applied between the base layer 140 and the polycarbonate panel 130. As with the example of FIG. 4, the base layer 140 emits visible light 114 across the visible light spectrum, and the color layers 150, 160, 162, 164 filter the emitted visible light 114 to achieve desired coloration.

In the example of FIG. 5, multiple color layers 160, 162, 164 are applied to portions of the polycarbonate panel 130. Each of the color layers 160, 162, 164 are configured to filter out light within specific wavelengths to achieve a desired coloration. By way of example, the color layers 160, 162, 164 can be designed and shaped to create or color the gauges 20, 30, 40 of FIG. 1, or portions of the gauges 20, 30, 40.

Once the partial color layers 160, 162, 164 have been applied any full color layers, such as the above described color layer 150 are applied over top of that, and the base layer 140 is applied as the furthest layer from the interior surface 134 of the polycarbonite panel. In some examples, the partial color layers 160, 162, 164 can overlap each other to create combination colors. By way of example, a red color layer and a blue color layer can overlap to create a purple color layer. In alternate examples, more or fewer color layers 150, 160, 162, 164 can be applied to achieve a desired profile or image visible to the viewer when the instrument cluster is illuminated.

Figure 6:
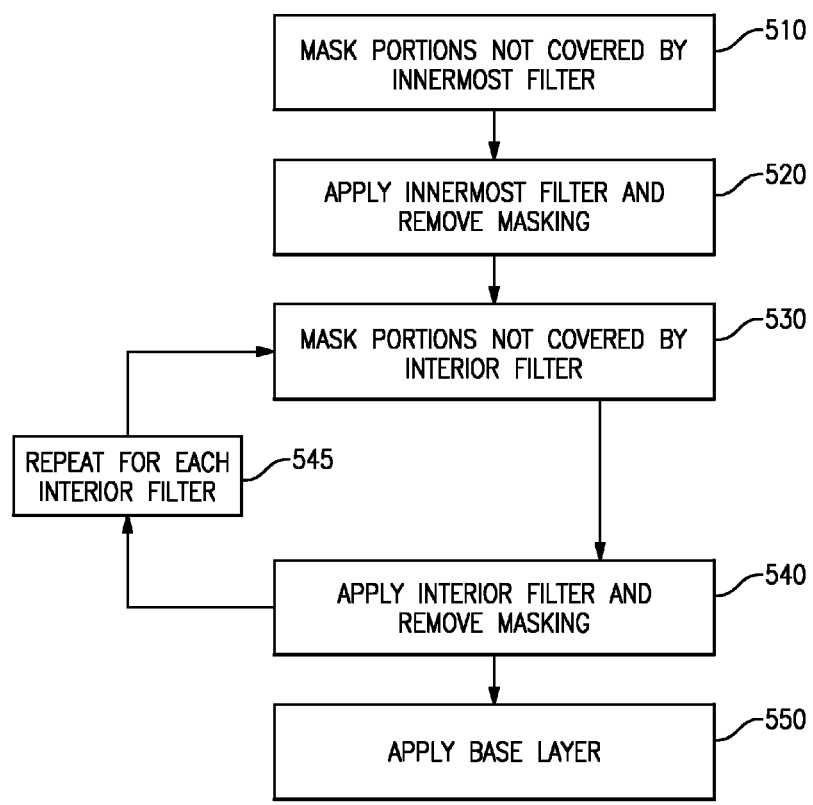
FIG. 6 is a process diagram illustrating at least a portion of the process for creating any of the instrument clusters of FIGS. 1, 2, and 4-6.

In order to apply the partial color layers 160, 162, 164, the full color layer 150, and the base layer 140, a combination of a vapor deposition process and a serigraphy technique is utilized. FIG. 6 is an example process flow illustrating the combined serigraphy and vapor deposition technique used.

Initially, interior surface of the carbonate panel 130 is masked, such that only the areas to be coated with the innermost color layer are exposed in a "mask portions not covered by innermost filter" step 510. The polycarbonate panel 130 is then exposed to a vapor deposition process applying the innermost color layer. Once the color layer 160, 162, 164 has been applied, the masking material is removed, resulting in the polycarbonate panel being coated in only the desired area with the innermost color layer. The application of the vapor deposition process and the removal of the masking are performed in an "Apply innermost filter and remove masking" step 520.

Once the innermost filter has been applied, the polycarbonate panel 130 is again masked for the next layer to be applied in a "mask portions not covered by interior filter" step 530. The next color layer is then applied using a vapor deposition process and the masking is removed, as with the second step 520, in an "apply interior filter and remove masking" step 540. Steps 530 and 540 are then repeated for each interior color layer that has not yet been applied, in a "repeat for each interior filter" step 545.

Once all of the interior color layers have been applied, a base layer 140 of the crystalline material is applied using the vapor deposition process in an "Apply base layer" step 550. The application of the base layer can be done without masking to completely coat the interior surface 134 of the polycarbonate panel 130. In other examples, portions of the interior surface 134 that are not exposed to the UV light 112 from the UV light sources 110 can be masked, and no base layer 140 is applied to those sections.

While the above disclosure is described with regard to a single polycarbonate panel 130 for an instrument cluster 10 in a vehicle, it is understood that the same process and idea can be applied to other vehicle interior components, thereby allowing for a greater uniformity in illumination components. Furthermore, while the above examples include only 3 partial color layers, it is understood that any number of partial or complete color layers can be applied between the interior surface of the instrument panel and base layer and still fall within the above disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An instrument cluster for a vehicle comprising:
   at least one ultra-violet light-emitting L.E.D;
   a translucent panel having first and second opposing sides, the first side facing said at least one ultra-violet light-emitting L.E.D., the second side of the translucent panel facing an observer and facing away from said at least one ultra-violet light-emitting L.E.D., said translucent panel and its first side being spatially separated from the ultra-violet light-emitting L.E.D; and
   a base layer disposed onto the first side of said translucent panel such that the base layer is between said first side of the translucent panel and said at least one ultra-violet light-emitting L.E.D;
   wherein said base layer comprises a crystalline-structure powder layer operable to generate visible light from ultra-violet light that impinges on said powder layer from the at least one ultra-violet light-emitting L.E.D.; and
   wherein the translucent panel is sized, shaped and arranged to keep ultra-violet light that is emitted from the ultra-violet light-emitting L.E.D. from impinging on the second side of the translucent panel, such that none of the ultra-violet light impinges on the second side of the translucent panel.

2. The instrument cluster of claim 1, further comprising:
   a first color layer disposed between said base layer and the first side of said translucent panel, wherein said first color layer, is configured to change the color of light that is emitted from said base layer and which passes through the translucent panel.

3. The instrument cluster of claim 1, further comprising a plurality of color layers disposed between said base layer and said first side of said translucent panel, wherein the plurality of color layers comprise at least a first color layer partially covering a first portion of said first side of said translucent panel and a second color layer partially covering a second portion of said first side of said instrument panel.

4. The instrument cluster of claim 3, wherein the plurality of color layers additionally comprise overlapping color layers.

5. The instrument cluster of claim 3, wherein each of the at least one color layers is a powder layer applied to the translucent panel via a serigraphy process.

6. The instrument cluster of claim 1, wherein said translucent panel comprises a polycarbonate.

7. The instrument cluster of claim 1, wherein the base layer covers all of said first side of said instrument panel that is exposed to light from said ultra-violet light-emitting L.E.D.

8. The instrument cluster of claim 1, wherein said translucent panel is a polycarbonate panel.

9. The instrument cluster of claim 1, wherein at least a portion of said base layer directly contacts said surfaces of said translucent panel.

10. The instrument panel of claim 1, wherein a portion of said base layer contacts a color layer and the color layer contacts the translucent panel.

* * * * *